(12) United States Patent
Rajapakse

(10) Patent No.: US 9,338,208 B2
(45) Date of Patent: *May 10, 2016

(54) COMMON EVENT-BASED MULTIDEVICE MEDIA PLAYBACK

(71) Applicant: Blackfire Research Corporation, San Francisco, CA (US)

(72) Inventor: Ravi U Rajapakse, San Francisco, CA (US)

(73) Assignee: Blackfire Research Corporation, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/505,411

(22) Filed: Oct. 2, 2014

(65) Prior Publication Data

US 2015/0074239 A1    Mar. 12, 2015

Related U.S. Application Data

(63) Continuation of application No. 14/303,502, filed on Jun. 12, 2014, which is a continuation-in-part of application No. 13/561,029, filed on Jul. 28, 2012, now Pat. No. 8,839,065, and a continuation-in-part of (Continued)

(51) Int. Cl.
*H04J 3/06* (2006.01)
*H04L 29/06* (2006.01)
*H04L 12/18* (2006.01)

(52) U.S. Cl.
CPC ............ *H04L 65/60* (2013.01); *H04L 12/1881* (2013.01); *H04L 65/4076* (2013.01); *H04L 65/608* (2013.01); *H04L 65/80* (2013.01);

(Continued)

(58) Field of Classification Search
USPC .............. 709/248; 707/201, 999.201; 607/60; 370/503–520; 375/353–376
See application file for complete search history.

(56) References Cited

U.S. PATENT DOCUMENTS

| | | | | |
|---|---|---|---|---|
| 7,203,858 B2* | 4/2007 | Loukianov | ......... | H04N 21/4302 370/516 |
| 7,607,062 B2* | 10/2009 | Grove | ..................... | H04L 47/10 370/474 |
| 8,279,896 B2* | 10/2012 | Etkin | .................... | H04W 56/00 370/503 |

(Continued)

*Primary Examiner* — Thai Hoang
(74) *Attorney, Agent, or Firm* — Galvin Patent Law PLLC; Brian R. Galvin

(57) ABSTRACT

A system for event-based synchronized multimedia playback, comprising a media source device and a plurality of destination devices, each destination device comprising a local clock, and a synchronization module on one of the devices. The synchronization module transmits common events, $E_n$, each with a unique event number, to each of the plurality of destination devices. Each destination device records time $Dx_n$ when event $E_n$ is received and transmits an acknowledgement message back to the synchronization module comprising time $Dx_n$ and event number n. The synchronization module determines phase and frequency differences between clocks of respective destination devices; computes a frequency adjustment to compensate for phase and rate differences; and directs each respective destination device to adjust its clock phase and frequency accordingly. Each destination device adjusts its local clock as directed or may perform a sample rate conversion on sample data in order to enable synchronized media playback.

11 Claims, 12 Drawing Sheets

Related U.S. Application Data application No. 14/083,426, filed on Nov. 18, 2013, now Pat. No. 8,762,580, which is a continuation-in-part of application No. 11/627,957, filed on Jan. 27, 2007, now Pat. No. 8,677,002, application No. 14/505,411, which is a continuation of application No. 14/303,527, filed on Jun. 12, 2014, which is a continuation-in-part of application No. 13/561,029, and a continuation-in-part of application No. 14/083,426, which is a continuation-in-part of application No. 11/627,957.

(60) Provisional application No. 61/833,927, filed on Jun. 12, 2013, provisional application No. 61/727,624, filed on Nov. 16, 2012, provisional application No. 61/833,928, filed on Jun. 12, 2013.

(52) U.S. Cl.
CPC .......... *H04L69/163* (2013.01); *H04L 69/166* (2013.01); *H04L 12/189* (2013.01)

(56) References Cited

U.S. PATENT DOCUMENTS

| | | | |
|---|---|---|---|
| 8,762,580 B2* | 6/2014 | Rajapakse | H04N 21/2368 607/60 |
| 2004/0177162 A1* | 9/2004 | Wetzel | H04L 29/06 709/248 |
| 2010/0198992 A1* | 8/2010 | Morrison | G10H 1/0058 709/248 |

* cited by examiner

COMMON EVENT-BASED MULTIDEVICE MEDIA PLAYBACK

CROSS-REFERENCE TO RELATED APPLICATIONS

This application is a continuation of U.S. patent application Ser. No. 14/303,502, titled "SYNCHRONOUS PLAYBACK OF MEDIA USING A WI-FI NETWORK WITH THE MEDIA ORIGINATING FROM A BLUETOOTH SOURCE", filed on Jun. 12, 2014, which claims the benefit of, and priority to, U.S. provisional patent application Ser. No. 61/833,927, titled "SYNCHRONOUS PLAYBACK OF MEDIA USING A WI-FI NETWORK WITH THE MEDIA ORIGINATING FROM A BLUETOOTH SOURCE", filed on Jun. 12, 2013, the entire specification of which is incorporated herein by reference, and is also a continuation-in-part of U.S. patent application Ser. No. 13/561,029, titled "PACKET LOSS ANTICIPATION AND PRE EMPTIVE RETRANSMISSION FOR LOW LATENCY MEDIA APPLICATIONS" filed on Jul. 28, 2012, and is a continuation-in-part of U.S. patent application Ser. No. 14/083,426, titled "COMMON EVENT BASED MULTI DEVICE PLAYBACK, filed on Nov. 16, 2013, which is a continuation-in-part of U.S. patent application Ser. No. 11/627,957, titled "Streaming Media System and Method" and filed on Jan. 27, 2007, and claims a benefit of, and priority, to U.S. provisional patent application Ser. No. 61/727,624, filed on Nov. 16, 2012, titled "COMMON EVEN BASED MULTIDEVICE MEDIA PLAYBACK" the entire specification of each of which is incorporated herein by reference.

This application is also a continuation of U.S. patent application Ser. No. 14/303,527, titled "BROADCASTING MEDIA FROM A STATIONARY SOURCE TO MULTIPLE MOBILE DEVICES OVER WI-FI" and filed on Jun. 12, 2014, which claims the benefit of, and priority to, U.S. provisional patent application Ser. No. 61/833,928, titled "BROADCASTING MEDIA FROM A STATIONARY SOURCE TO MULTIPLE MOBILE DEVICES OVER WI-FI", filed on Jun. 12, 2013, the entire specification of which is incorporated herein by reference, and is also a continuation-in-part of U.S. patent application Ser. No. 13/561,029, titled "PACKET LOSS ANTICIPATION AND PRE EMPTIVE RETRANSMISSION FOR LOW LATENCY MEDIA APPLICATIONS" filed on Jul. 28, 2012, and is a continuation-in-part of U.S. patent application Ser. No. 14/083,426, titled "COMMON EVENT BASED MULTI DEVICE PLAYBACK, filed on Nov. 16, 2013, which is a continuation-in-part of U.S. patent application Ser. No. 11/627,957, titled "Streaming Media System and Method" and filed on Jan. 27, 2007, and also claims a benefit of, and priority, to U.S. provisional patent application Ser. No. 61/727,624, filed on Nov. 16, 2012, titled "COMMON EVEN BASED MULTIDEVICE MEDIA PLAYBACK" the entire specification of each of which is incorporated herein by reference.

BACKGROUND

1. Field of the Art

The disclosure relates to the field of digital media, and more particularly to the field of synchronized digital multimedia playback.

2. Discussion of the State of the Art

Today there are many forms of digital media, many types of digital media sources, many types of digital media playback (rendering) systems and lots of ways of connecting media sources to media playback systems.

Digital media, hereafter referred to as media, comes in many forms, formats and containers, including Digital Video Disks, media files and media streams. The media contents can be audio, video, images or meta data media components and various combinations of each. For example a popular audio format is known as MP3 and a popular video format is H264. MP3 is an audio-specific media format that was designed by the Moving Picture Experts Group (MPEG) as part of its MPEG-1 standard and later extended in the MPEG-2 standard. H264 is a standard developed by the International Organization for Standardization (ISO)/International Electrotechnical Commission (IEC) joint working group, the Moving Picture Experts Group (MPEG). Movies are typically multimedia formats with a video and multiple audio channels in it. For example a 5.1 movie contains 1 video channel (media component) and 6 audio channels (audio components). 5.1 is the common name for six channel surround sound multichannel audio systems.

Digital media sources include media devices such as Digital Video Disk players, Blu-ray players, computer and mobile devices, and internet based "cloud" media services. Blu-ray Disc (BD) is an optical disc storage medium developed by the Blu-ray Disc Association. Internet based media services include services such as Netflix™ and Spotify™. Netflix is a media service and trademark of Netflix Inc. Spotify™ is a media service and trademark of Spotify Ltd. Digital media playback (media rendering destinations) systems include computer based devices, laptops and smartphones, as well as network audio and video devices. A SmartTV is an example of a digital media-rendering device that can play media from an internet (cloud) based media service such as Netflix™. A SmartTV, which is also sometimes referred to as "Connected TV" or "Hybrid TV", is used to describe the integration of the internet and Web features into modern television sets and set-top boxes, as well as the technological convergence between computers and these television sets/set-top boxes. An Internet radio device is another example of a digital media rendering device.

The connectivity between these media sources and devices is varied, but is evolving over time towards network-based connectivity using Internet protocol (IP) protocols. This is because IP connectivity is convenient, ubiquitous, and cheap.

IP networks come in many forms; the most prevalent being Ethernet based wired IP networking. Ethernet is a family of computer networking technologies for local area networks (LANs) that is standardized as IEEE (Institute of Electrical and Electronics Engineers) Standard 802.3. In recent years with the prevalence of mobile computing devices, Wi-Fi (a type of IP network) has become the most popular means for connecting network devices wirelessly. Wi-Fi is a trademark of the Wi-Fi Alliance and a brand name for products using the IEEE 802.11 family of standards. IP networks can use several different types of messaging including unicast, multicast, and broadcast messaging, such messaging being the sending of IP packets.

The term "Unicast" may be used to refer to a type of Internet Protocol transmission in which information is sent from only one sender to only one receiver. In other words, unicast transmission is a one-to-one node transmission between two nodes only. In unicasting each outgoing packet has a unicast destination address, which means it is destined for a particular destination that has that address. All other destinations that may hear that packet ignore the packet, if the packet's destination address is not the same as that destination's address.

Many IP protocols are accessed from software programs via a socket application programming interface. This socket interface is defined as part of the POSIX standard. POSIX is an acronym for "Portable Operating System Interface", which is a family of standards specified by the IEEE for maintaining compatibility between operating systems.

The convenience and benefits of IP networking means that all of these media sources and playback systems, if not already network enabled, are becoming network enabled. Many Blu-ray players now have Ethernet and Wi-Fi network connectivity. Today most higher-end TVs are smart TVs that have network capability. Similarly audio play back devices and even radios are network and Internet enabled.

Mobile devices, such as mobile phones, tablets, document readers, or notebooks, are able to receive and store media and have powerful multimedia (audio and video) capabilities and may be connected to the internet via cell phone data services or broadband links (such as Wi-Fi) that are high bandwidth and can access online media services that have wide and deep content.

The use cases or applications of these various forms of digital media, media services and media sources and playback systems have been evolving. Initially it was enough to connect a media source to a media destination over an IP network. This is widely used today with Internet based media source services, such as Netflix and a computer as a media destination. Users watch Netflix movies streamed over a wired IP network (the internet) to a computer. This is a case of a single point (one IP source) to single point (one IP destination) connection over a wired IP network. Even though the Netflix media service may send the same media to multiple households, each of these is a single point to single point TCP/IP connection. A further evolution of this is to use a wireless, Wi-Fi connection, instead of a wired Ethernet connection. This is still a single point to single point connection.

A further extension of the above use cases exists, where a media source connects to multiple destinations rather than a single destination. These are single point (one IP source) to multi point (multiple IP destinations) applications. An example would be where a user is playing a 5.1 movie media file to a wireless video playback device and 6 independent wireless audio destinations making up a full 5.1 surround sound system. In this case the media is going from one media source to 7 media destinations simultaneously. In another example, a user is playing music from one media source to six audio playback systems placed around the home in six different rooms.

In both of these cases, it is necessary to play (render) the media at all destinations time synchronously. Furthermore, it is necessary to limit the use of resources at the media source, such as keeping memory use to a minimum. In addition, it is necessary with multiple devices receiving media to manage network bandwidth efficiently.

Currently when the same media data needs to be sent to multiple network destinations, the general technique for doing so is to use data multicasting to the multiple destinations that need to receive the data. In such a system, the media is multicast to all the destinations and it is up to each destination to attempt to render the media appropriately. If during rendering there is an error where a renderer does not receive new media data or does not receive it correctly, the renderer may render erroneous data and then attempt to recover and continue correct media rendering from the point after the error when correct data is received.

In the applications envisioned here, there is a need to send media from a source to multiple media devices, such as TV and speakers in the same listening and viewing space. Furthermore there is a need to send this media over a wireless network such as Wi-Fi.

For these applications, this means all of the media rendering devices, such as speakers, that are in the same listening or viewing zone, need to be precisely synchronized to each other, so the listener and/or viewer does not discern any unintended media experience.

Secondly, because the media is transported over wireless, there is a very high likely hood of a media error, where the media is not received at each destination reliably or uniformly. If using broadcast or multicasts to send packets, the same broadcast or multicast packet, may be received at one destination but not received/heard by another destination.

SUMMARY

Disclosed is a method for event-based synchronized multimedia playback that solves the above problems of media error and loss of synchronization when transmitting to multiple media receiver devices.

According to a preferred embodiment, a system for event-based synchronized multimedia playback comprising a plurality of media playback devices each of which maintains audio phase and timing through synchronization based on crystal clock cycles, is disclosed. According to the embodiment, a plurality of media playback devices may be connected to a plurality of media source devices by way of an IP-enabled network such as the Internet or any other data network utilizing an IP protocol. Media may be broadcast over such a network to playback devices, each of which may play similar or distinct media elements as may be desirable during playback (for example, one speaker may play the left audio channel while a second speaker the right audio channel, as is common in sound systems in the art).

According to a preferred embodiment, a system for event-based synchronized multimedia playback, comprising a media source device and a plurality of destination devices each comprising a local clock, is disclosed. The synchronization module in the media source device transmits a common events $E_n$, comprising a unique event number n at the media source to each of the plurality of destination devices. Each destination device records time $Dx_n$ when event $E_n$ is received and transmits an acknowledgement message back to the synchronization module comprising time $Dx_n$ and the unique event number n. The synchronization module, for each of the plurality of receiver devices, determines the phase and frequency differences between the clock signal of the respective receiver devices; computes a phase and frequency adjustment to compensate for differences; and directs the respective destination device to adjust its clock phase and frequency accordingly. Each receiver device adjusts its local clock as directed or performs a sample rate conversion in order to synchronize media playback.

According to another preferred embodiment, a method for event-based synchronized multimedia playback is disclosed, the method comprising the steps of: (a) periodically transmitting, from a media source device, containing a synchronization module, and connected to a network and adapted to stream media over the network, a common event $E_n$ comprising a unique event number n; (b) receiving via the network, at each of a plurality of receiver devices comprising a local clock, the event $E_n$; (c) recording at each receiving device a time $Dx_n$ when event $E_n$ is received; (d) transmitting an acknowledgement message from each receiving device back to the media source comprising at least the time $Dx_n$ and the unique event number n (e) determining, using a synchronization module stored and operating on one of the media source device and the plurality of destination devices, the phase and frequency difference between the clock signals of the respective destination devices; (f) computing a frequency adjustment to compensate for the phase and frequency difference determined in step (e); (g) directing the respective receiver device to adjust its clock phase and frequency by an amount equal to the frequency adjustment computed in step (f); and (h) adjusting the local clock of each receiver device as directed in step (c) in order to synchronize media playback.

BRIEF DESCRIPTION OF THE DRAWING FIGURES

The accompanying drawings illustrate several embodiments of the disclosed configuration and, together with the description, serve to explain the principles of the invention according to the embodiments. One skilled in the art will recognize that the particular embodiments illustrated in the drawings are merely exemplary, and are not intended to limit the scope of the disclosed embodiments.

DETAILED DESCRIPTION

Figure 1:
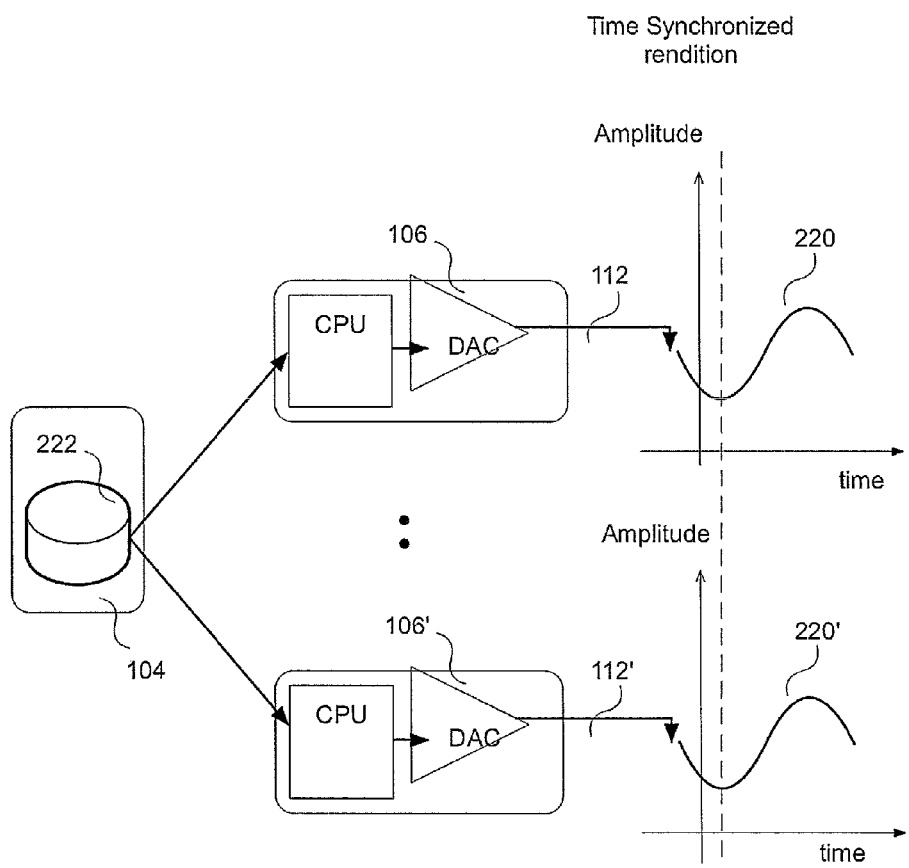
FIG. 1 is an illustration of an exemplary multimedia system comprising two audio subsystems, according to an embodiment of the invention.

The term "Unicast" may be used to refer to a type of Internet Protocol transmission in which information is sent from only one sender to only one receiver. In other words, unicast transmission is a one-to-one node transmission between two nodes only. In unicasting each outgoing packet has a unicast destination address, which means it is destined for a particular destination that has that address. All other destinations that may hear that packet ignore the packet, if the packet's destination address is not the same as that destination's address.

As used herein, "broadcast messaging" or "broadcasting" refers to a type of Internet Protocol transmission in which information is sent from just one computer, but is received by all the computers connected on the network. This would mean that every time a computer or a node transmits a "broadcast" packet, all the other computers could receive that information packet.

As used herein, "multicast messaging" or "multicasting" refers to a type of Internet Protocol transmission or communication in which there may be more than one sender and the information sent is meant for a set of receivers that have joined a multicast group, the set of receivers possibly being a subset of all the receivers. In multicasting, each multicast packet is addressed to a multicast address. This address is a group address. Any destination can subscribe to the address and therefore can listen and receive packets sent to the multicast address that it subscribed to. The benefit of multicasting is that a single multicast packet sent can be received by multiple destinations. This saves network traffic if the same packet needs to be sent to multiple destinations. When the same data needs to be sent to multiple IP destinations generally, broadcasting or multicasting, rather than unicasting, provides the most efficient use of the network.

In this description the terms broadcast and multicast may be used. In both broadcasting and multicasting, when messages are sent, they are received by multiple destinations. Therefore as used herein, the terms broadcast and multicast may be used interchangeably to refer to one packet being received by multiple destinations. In some cases this description only refers to the media being sent or transmitted without specifying whether it is broadcast, multicast or unicast. In such case, it means any one of these methods may be used for sending or transmitting the media.

As used herein, the terms "message" and "packet" are often used and may be used interchangeably. A packet is a data set to be sent or received on an Internet Protocol ("IP") network. The packet may or may not be the same as an "IP packet". The term "message", as used herein, refers to the logical information contained in such a packet.

As used herein, the "segment" may also be used to refer to a data set. A data set is a set of bytes of data. Data may be any type of data, including media or control or informational data. In this description the term data and packet may also be used interchangeable depending on context. "Packet" may refer to a data set and data refers to data in general.

Description of the Embodiments of the Invention

Numerous alternative embodiments are disclosed herein; it should be understood that these embodiments are presented for illustrative purposes only. The described embodiments are not intended to be limiting in any sense. In general, embodiments are described in sufficient detail to enable those skilled in the art to practice one or more of the inventions, and it is to be understood that other embodiments may be utilized and that structural, logical, software, electrical and other changes may be made without departing from the scope of what is disclosed.

According to an embodiment of the invention, in order to broadcast media over a Wi-Fi network, it is first necessary to recognize that broadcast or multicast media will not be received at all destinations uniformly. Some destinations will receive a multicast "packet" (referring to a data set to be sent or received on an Internet Protocol ("IP") network. The packet may or may not be the same as an "IP packet". The term "message", as used herein, refers to the logical information contained in such a packet; may also be referred to interchangeably as a "message", or "segment"), while others will not.

IP networks were first designed to operate over wired networks. By design, the packet communications on these networks were "best effort". This means any packet transmitted on the network may not be received by the intended destination. This is most often due to a collision, where another device starts to communicate at the same moment as the device of interest, thereby causing a collision. Another method of loss would be the devices in the network path, such as routers, simply dropping the packet, for example due to the lack of buffer space. Other reasons for loss could be that the wired line is simply noisy and the packet transmission got corrupted, though this is rare for the wired case vs. the wireless case.

In all these wired situations it is generally the case that, if the transmission (for example, a multicast message), was received by one device on a subnet or wire, all the other devices on the same wire or subnet would also receive the transmission correctly. This is because in the wired case, the noise or interference situation of a device on one part of the wire is not so different from the noise situation at another part of the wire. If the wired devices are connected via a switch rather than a hub, the same issues are true, and the amount of noise or interference is minimal.

In Wi-Fi the differences in receipt of Wi-Fi traffic at each Wi-Fi device in a subnet is substantial. Therefore it is necessary to account for this.

According to an embodiment of the invention all devices (i.e., a source device 104 and various destination devices 106 and 106') (see FIGS. 1 and 3) may be networked together on a local network 120. This is typically an IP network and may be a wired or a wireless (e.g. Wi-Fi) network. This local network may be further connected to the Internet.

In many media systems it is desirable to send the media to multiple playback devices and have each playback device render the media in phase. For example it is desirable to send the left channel of stereo audio media to the left audio playback device and the right channel of the stereo media to the right audio playback device and to have both these devices play the media correctly in phase.

FIG. 1 shows such a system with two digital audio subsystems, a first subsystem 106 and a second subsystem 106'. Each renders the same or related audio data. For example each audio subsystem may be receiving media from a media file 222 on a network. Each system (that is, audio systems 106 and 106') comprises a central processing unit (CPU) and a digital-to-analog converter. Each system 106, 106' renders audio output 112 and 112' via DACs. In this case rendered output waves 220 and 220' need to be in audio phase as shown in FIG. 1. To be in audio phase, the rendered waves 220 and 220' need to have the correct sounds (frequency spectrum) playing at the correct time (phase offset). For example if the media contains a left channel that rings a bell 1 minute into the media and the right channel plays a drum beat at the same time, and the device 106 is to play the left channel and the device 106' is to play the right channel. Then the devices are in phase, if 1 minute into media playback, device 106 renders the bell sound and device 106' renders the drum beat.

If rendered waves 220 and 220' are not in phase, then users may hear a beat frequency that is related to the difference in frequency between the two waves 220 and 220'. Furthermore, over time, the two audio outputs may differ to a continually increasing extent. For instance, in the example used previously, if the second subsystem 106' is off by +50 parts per million (ppm), and a 3 minute song ends with a drum beat, the second subsystem 106' will play the final drum beat 9 milliseconds later than the first subsystem 106. After ten such songs the difference will be 90 milliseconds, which will be very noticeable.

Therefore, when multiple audio devices 106 and 106' are playing the same media, it is necessary to adjust and ensure that the rendering clock on each system has the same phase offset and frequency.

Figure 2:
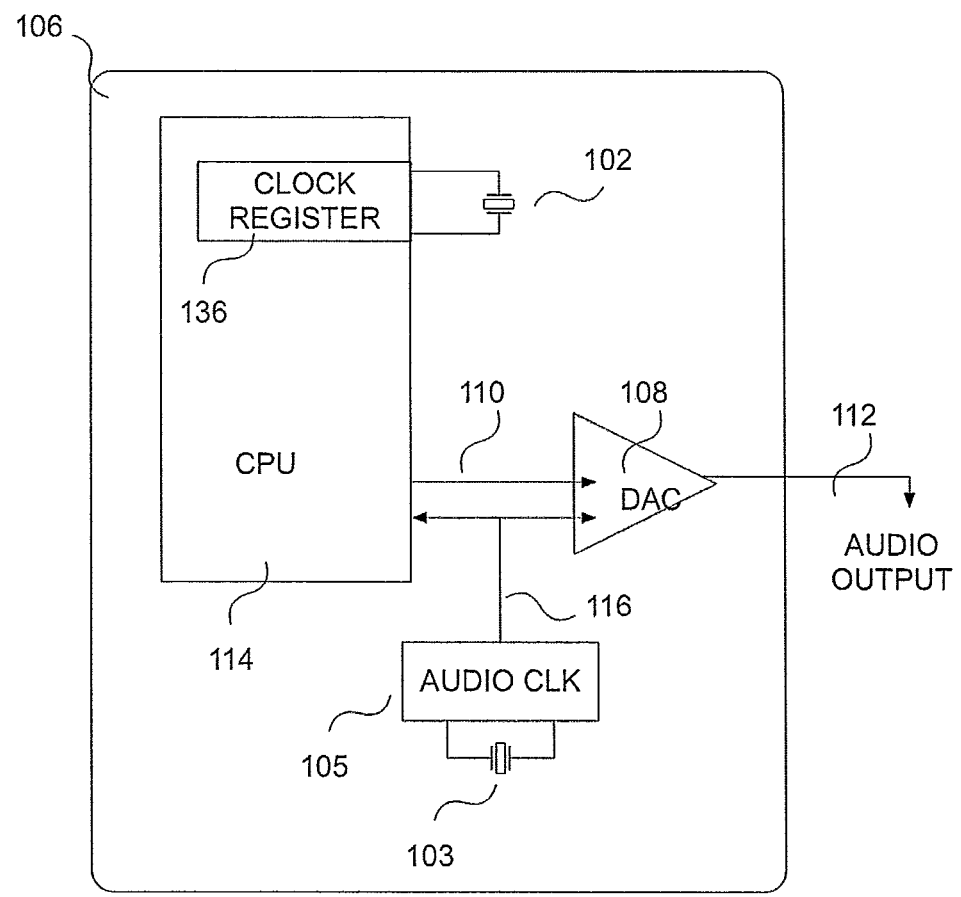
FIG. 2 is a detailed illustration of an exemplary audio playback system, according to an embodiment of the invention.

FIG. 2 shows a typical digital system 106 for playing audio in more detail. The CPU 114 sends audio samples to the DAC 108 which are rendered by the DAC 108, converting the digital samples into analog signals 112. The rate at which the DAC converts digital samples into analog signal levels is called the output sample rate and the output sample rate typically matches the rate at which the audio samples being sent from the CPU 114 were sampled at. The exact output sample rate is determined by a DAC clock subsystem that is driving the DAC. The accuracy of this clock subsystem will impact the accuracy of the output sample rate and therefore the accuracy of the rendering of audio by this system. This clock subsystem may use a clock originating from the CPU 114 or from an external source 105.

A CPU clock crystal 102 on a typical CPU 114 will be the basis of the CPU clock generated internally by CPU 114. This CPU clock will then be used for all CPU timing activity. Some CPUs may generate many different clock signals internal to CPU 114, based on this CPU clock. CPU 114 may also have many clock peripherals and clock registers 136, based on the CPU clock that can be used for various timing related activities. For example, a clock peripheral may be configured to interrupt the CPU periodically every 100 milliseconds. Since this clock is based originally on CPU crystal 102, the accuracy of this period will depend on the accuracy of CPU crystal 102. Typically a program running on CPU 114 can also read a clock register 136 which will show the number of clock counts CPU 114 has counted since CPU 114 was powered up and reset. These clock counts will increment at a rate that is related to CPU crystal 102. This clock may be used to drive the DAC output sample rate and the rate at which audio samples are provided to the DAC.

In some embodiments, system 106 may further comprise a separate audio clock 105, with its own independent crystal 103, for sending an audio clock signal 116 to CPU 114 and DAC 108 for managing the timing of playback of audio signals sent from CPU 114 to DAC 108, and for generating audio output 112 from such audio signals via the DAC 108.

Alternate embodiments may use various combinations of external and internal clock sources to drive the DAC sample rate.

In media systems, such as that shown in FIG. 1, where it is necessary to send the media to multiple playback devices and to have each playback device render the media in phase, the media needs to be marked with some time reference information and each device needs to play this media according to this time information. This means each device needs to use the same time reference so that its rendering activity is time aligned.

Figure 3:
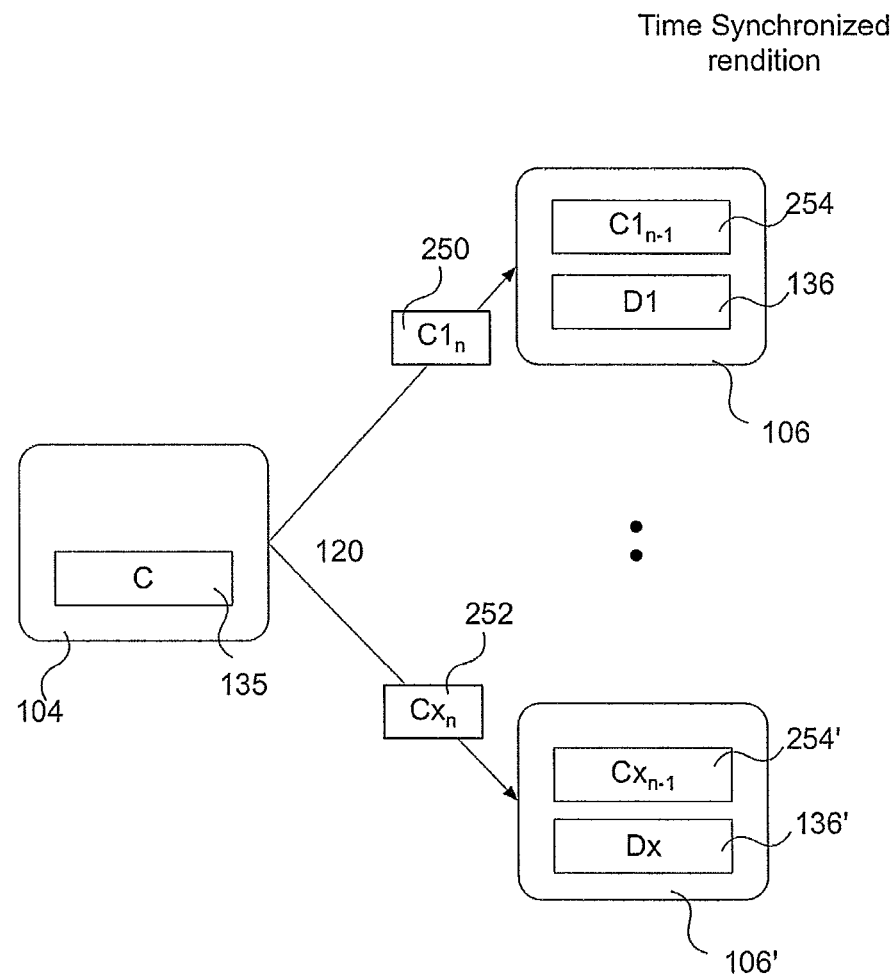
FIG. 3 is an illustration of an exemplary clock-based system for time referencing, according to an embodiment of the invention.

FIG. 3 illustrates a common clock based approach to time referencing as described previously. As illustrated, a source device 104 and one or more destination devices 106, 106' may be connected by a network 120. Source device 106 has a local clock C 135, the "common" source clock, and each destination device 106, 106' also contains a local clock designated as D1 136 for the first device 106 and Dx 136' for the xth device 106'. Source clock 135 is referred to as a common source clock because its clock value is sent to all the destinations and is used as a standard clock in common to all the devices. Source device 104 periodically sends "clock" messages to each destination device 106, 106' containing the latest common source clock value C that was read prior to sending the message. Clock messages being sent to the $1^{st}$ device at period n with a clock value are marked as $C1_n$ 250, and clock messages being sent to the xth device at period n with a clock value is marked as $Cx_n$ 252. When each destination device 106, 106' receives a clock message it records the latest clock value it received $C1_n$ or $Cx_n$ as 254 and 254'. When each destination 106, 106' receives a clock message it also records the corresponding local clock value, $D1_n$ or $Dx_n$, that goes with the $C1_n$ or $Cx_n$ common clock value it received. There is a delay from the moment of receipt of the clock message to when the local clock associated with it is recorded. This "recording" delay may vary from clock message to clock message and is defined as a recording jitter R. This change in recording delay may be due to the network adapter used for the messaging and changing response time of the software on the destination to a packet receipt.

Figure 4:
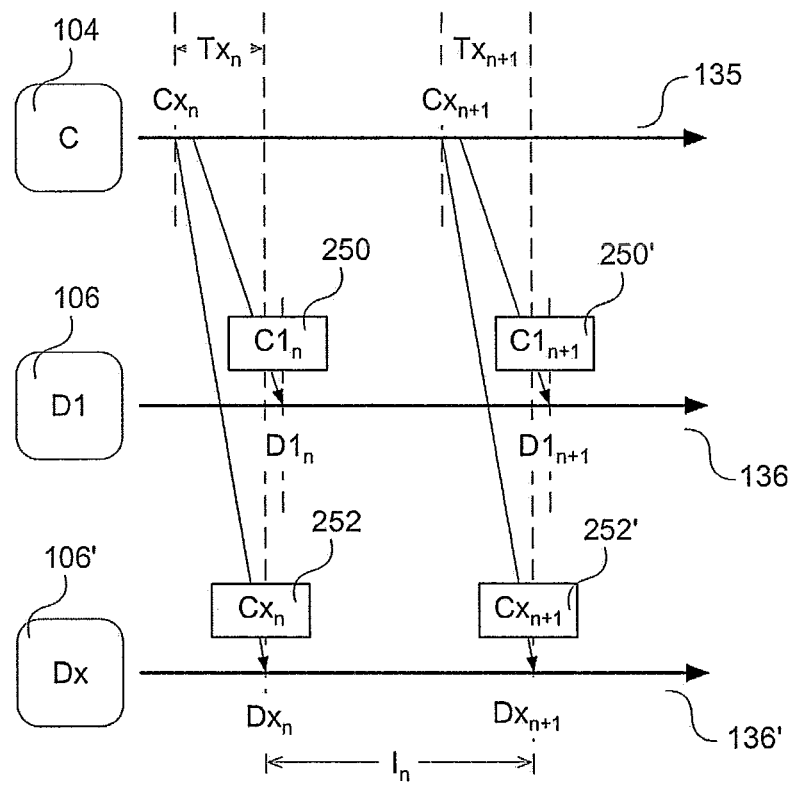
FIG. 4 is an illustration of an exemplary message timeline, according to an embodiment of the invention.

FIG. 4 shows a timeline of the message transactions. Source device 104 sends the nth clock messages, with clock values $C1_n$ 250 to first device 106 and $Cx_n$ 252 to xth device 106'. The n+1th message and so on are similar. Each clock message will take a certain amount of time (transport time) to get from a source 104 to each destination 106-106'.

The time for the nth message to get to the xth device is $Tx_n$. The transport time to each destination may be different due to network packet transmission issues. This difference will change over time and from device to device. These changes in Tx are referred to as transport jitter Jx at device x.

Based on the information in each clock message $Cx_n$ and the corresponding local clock value $Dx_n$ recorded, each destination x 106, 106' may compute information to adjust its local clock Dx 136, 136' to match common source clock C 135. Destinations 106, 106' may adjust local clocks' D1, Dx 136, 136' phases (counts) Px to match a best estimate of the current phase (count) Pc of the source clock C 135. Similarly, destinations 106, 106' may adjust local clocks' D1, Dx 136, 136' frequencies Fx to match a best estimate of current frequency Fc of common source clock C 135.

Exemplary calculations for performing these steps may be as follows:

$Cx_n$: nth Common source clock value sent to device X
$TA_x$: Average estimated transit time to device X
$RA_x$: Average estimated recording time at device X
Jx: Max transit time deviation from average $TA_x$
Rx: Max recording time deviation from average
$Tx_n$: Transport time of nth message sent to device X
$Dx_n$: Device x's clock value at nth clock message
$Fx_n$: Device x's new local clock Frequency
$Px_n$: Device x's new local clock Phase/Count
$Cx'_n = Cx_n + Tx_n + Rx_n$: Estimate Common clock n
$Cx'_{n+1} = Cx_{n+1} + Tx_{n+1} + Rx_{n+1}$: Est Common clock n+1
$Tx_n = Ta_x +/- Jx$: Transport Time n
$Tx_{n+1} = Ta_x +/- Jx$: Transport Time n+1
$Rx_n = Ra_x +/- Rx$: Recording Time n
$Rx_n + 1 = Ra_x +/- Rx$: Recording Time n+1
$Ax_n = (Dx_{n+1} - Dx_n) - (Cx'_{n+1} - Cx'_n)$: Frequency Adjustment
$Ax_n = (Dx_{n+1} - Dx_n) - (Cx_{n+1} - Cx_n) +/- 2*Jx +/- 2*Rx$
$Fx_n = Fx_{n+1} - Axn$: New Frequency
$Fx_n = Fx_{n-1} + (Cx_{n+1} - Cx_n) - (Dx_{n+1} - Dx_n) +/- 2*Jx +/- 2*Rx$
$Px_n = Cx'_n = Cx_n + Ta_x +/- Jx +/- Rx$: Phase Offset Estimating the transport time Tx is critical for this system. One common way of doing this is to measure round trip time from source to destination by sending a message from source 104 to destination Dx 106, 106' and having destination Dx 106, 106' acknowledge this message. The total time from sending an outgoing message to receiving an incoming acknowledge message is the round trip time. Halving this time provides an estimate of outgoing transit time. If this is done many times and filtered, the filtered result $Ta_x$ can be used as the average transit time from a source to destination Dx. The actual transit time $Tx_n$ for the nth message will be $=Ta_x +/- Jx_n$, where $Jx_n$ is the jitter—the deviation from the average for this nth message. $Jx_n$ can be estimated using the standard deviation of the Tx times measured.

In this scheme each destination device 106, 106', uses the common source clock 135 information to adjust its local clock 136, 136' values and clock rate to match that of common source clock 135. That is, common source clock 135 is a "global" clock used in the system and all destination clocks are aligned to this. The media is then rendered at each device using local clocks 136, 136'.

The precision of this system may be limited because transport jitter may impact both the frequency and phase calculations. This may be mitigated somewhat by filtering the parameters used in the calculation over a period of time, as mentioned above. The rendering of the media is done by destination devices 106, 106'; since clocks associated with these devices are used as a basis for media rendering, this means the phase accuracy of media rendering is affected by transport time jitter. If transport time jitter Jx is +/-1 to 2 milliseconds, as it can be on a Wi-Fi network, then the maximum phase accuracy that can be achieved is limited to this range.

A further issue with this system is that virtual clock time only increments at intervals of received messages. This can be addressed by using a local clock to interpolate time in between these message intervals. The problem is that each device's local clock may be slightly different from the others, and therefore interpolated virtual clocks may jump forward or move slightly backwards at each adjustment made as a result of received messages. This may cause the media rendering to jump forward or backwards by small amounts from time to time.

A further issue is that in many systems a common global clock is not available or even if it is available, it is not accurate enough for synchronization purposes. For example the source devices local clock may be accessed through a programming API, however since the caller program is usually running in a multitasking operating system that may have delays or task swaps during the API call, the local clock time will be incorrect by that time. For example the caller program may call the local clock API and it may read the hardware clock value, then before the function returns the current program thread is tasked swapped and returns only in the next program thread time slice. This means the hardware clock value returned is now out of date by the time slice period. Most common operating systems can have a time slice period of up to 25-100 milliseconds, so the hardware clock value may be out of date by many milliseconds. This is the case for many general purpose source devices such as Smartphones or notebooks. By contrast the destination devices used in this invention are special purpose devices and therefore the software operates at a lower level with much better local clock read accuracy.

Therefore various embodiments of the invention may be designed with the goal of not using or requiring the ability to read the source devices local clock accurately.

The disclosed configuration renders media using each device's local rendering clocks only. The destination devices local clock referred to here is the clock that is used as the base for the rate (sample rate) at which media samples are fed to the DAC (digital to analog converter) to convert (render) the digital media samples into audio or video signals. This local clock may be a hardware clock or it may be a virtual clock, a software object, such as an interrupt service routine, that may be assisted by a hardware clock, feeding samples to the DAC for conversion to audio or video signals.

These destination clocks are continuous and smooth in how they increment and therefore smooth in how they render the media. However, it may be necessary to adjust for the potential differences in device clocks. One embodiment addresses this adjustment by breaking into two problems. The first problem is detecting the frequency differences. The second problem is adjusting for the differences. To detect the difference one embodiment uses a common event-based technique rather than a common clock.

Figure 5:
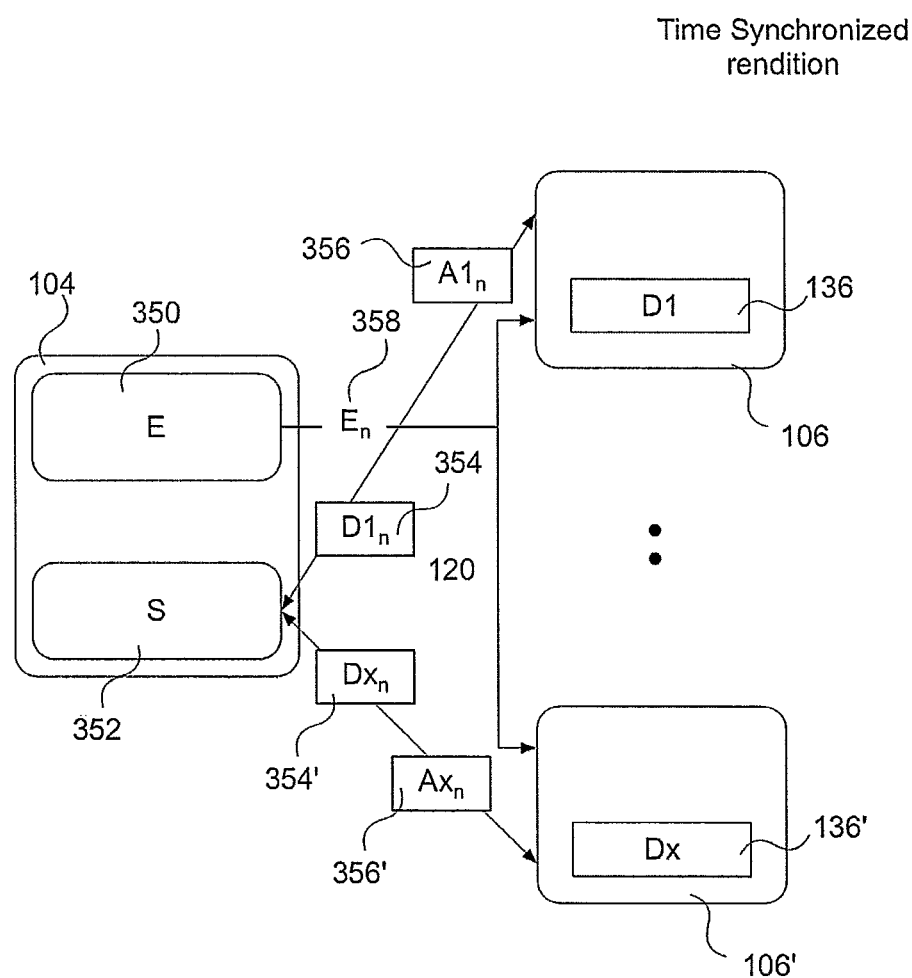
FIG. 5 is an illustration of an exemplary common event-based system according to an embodiment of the invention.

FIG. 5 is an illustration of the basic elements of an example common event-based system. The system consists of a source 104 and one or more destination devices 106, 106' connected by a network 120. The source device has two elements, a common event source E 350 and a synchronization calculation manager (synchronization manager) S 352. Common event source E 350 generates event messages on the network that are received at a common time, the same time, at all the destination devices. An example of a common event message $E_n$ 358 is a multicast or broadcast message received simultaneously by all destination devices 106, 106'. Note a multicast or broadcast message is put on the communication channel by one device, the source device and received by all destination devices. The message is actually communicated on the communication channel usually by electrical means with either an electrical or RF signal travelling close to the speed of light. Therefore for example the last bit of the message is received by all destination devices at a time that is only different by the distance times the speed of light, which is almost instantaneous. Another example of a common event message is a beacon message in a network using for example the 802.11 (Wi-Fi) network protocol.

In one embodiment, any series of events that are received by all the destination devices, and where each event is uniquely identifiable and where each event is received by all the destination devices as the same time, may be used as the common event described here. In one embodiment, the synchronization manager S 352, is the source of such common events.

The synchronization calculation manager S 352 may reside on any computing device on the network 120 including on a destination device 106, 106'.

Each destination device x (106, 106') has a local clock Dx (136, 136') that is used as the basis for rendering media by the device.

Figure 6:
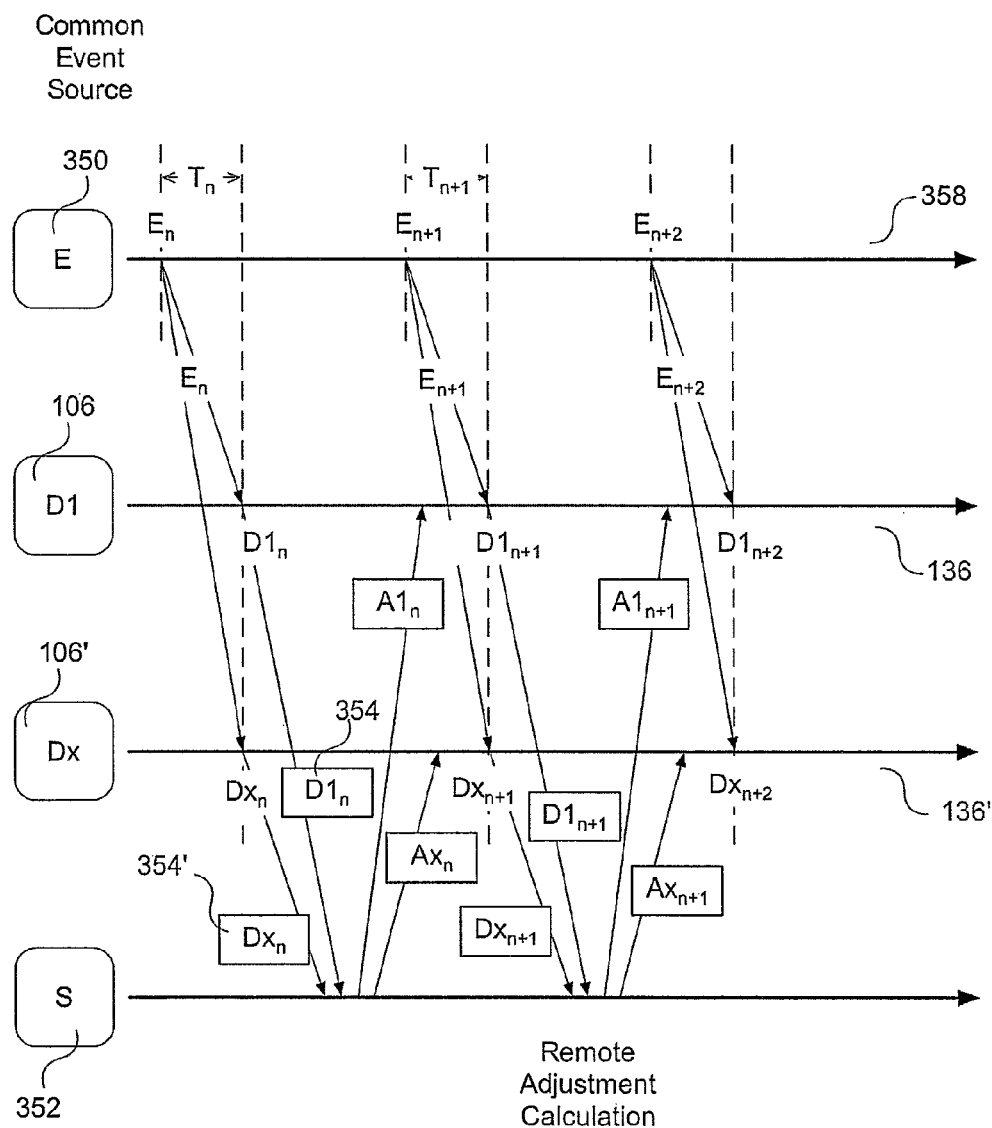
FIG. 6 is an illustration of an exemplary event timeline according to an embodiment of the invention.

FIG. 6 shows a timeline for the activities and messages in the system. The event source E 350 generates event message, where the nth event is marked as $E_n$ 358, generated at time $t_n$. The event $E_n$ 358, is identified by an even number n, which is unique to each event. The event number, n, could just be a sequentially incrementing number generated by the Synchronization manager S 352, from the time the system was turned on, or it could be a time stamp value. If the later, this is only used as a unique number, the time value is Not used as an indicator of time. Any other form of generating a unique event number is fine. On receipt of each event message $E_n$ each destination x records the current value of its local clock Dx 136 as $Dx_n$. As in the common clock case, there is a delay from the moment of receipt of the event message to when the local clock associated with it is recorded. This "recording" delay may vary from event message to event message and is defined as a recording jitter R.

Each destination device x, on receipt of an event message n, sends an event Acknowledge message $AK(Dx_n)$ 354, 354', for the nth event, with the value $Dx_n$ that was recorded on receipt of the event n, and the unique event number n, to the synchronization calculation manager S 352. The synchronization calculation manager receives all event Acknowledge messages $AK(Dx_n)$ 354, 354', with $Dx_n$ values in them, performs calculations, and then sends back clock adjustment messages $AJ(Ax_n)$ 356, 356' to each device x with Adjustment information $Ax_n$ in it. The calculations performed are shown below:

$Ex_n$: nth Common event message sent to device X;
$Tx_n$: Transport time of nth event sent to device X;
$Dx_n$: Device x's clock value at nth event message;
$Fx_n$: Device x's new local clock Frequency;
$Px_n$: Device x's new local clock Phase/Count;
$Qx0=Dx_0-D1_0+/-2*Rx$: Reference (Initial) Clock Phase vs Device 1
$Qx_n=Dx_n-D1_n+/-2*Rx$: nth Clock Phase;
$Qf_n=F(Qx_n)$: Filter function for the nth Clock Phase;
$ex_n=(Qf_n-Qf_0)+/-4*Rx$: phase error (change);
$kx_n=T*ex_n$: error*Transfer function;
$Fx_n=Fx_0+kx_n+/-T*4*Rx$: New Frequency;
$PFx_n=((Fx_n/Fx_{n-1})-1)*100$: Percent New Frequency;
$Px_n=Dx_n-D1_n+/-2*Rx$: Phase offset; and
$Ax_n=(PFx_n, Px_n)$: adjustment information.

In this common event system, one device's clock, the first destination device, device 1, is used as the phase reference clock. With these calculations the synchronization module computes a phase offset (local clock value) and a percent frequency (local clock rate) adjustment for each destination device x, sends this adjustment information to the destination x and asks it to make adjustments so that the local clock at each destination device x will match that of the local clock of destination device 1.

For example, ignoring the jitter, if between common even event 1, E1, and event 2, E2, the first destination devices local clock increments 100 counts and destination device x increments 101 counts, then device x is running fast with respect to destination device 1 and its clock rate needs to be decreased by 1 count out of 101. Further more if the 1st destination devices, local clock was 2500 at Event 1, E1, and destination x local clock was 3000 at Event 1, E1, then destination x's local clock needs to be adjusted to 2500 to match the phase of the 1st destination device.

While this embodiment defines the frequency adjustment as a percent of frequency, other embodiments may define the frequency adjustment in other forms including an absolute new frequency or the number of samples to add or drop. All of these forms are referred to as frequency adjustment for the purpose of this specification. Also the use of the word frequency refers to a clock rate and is related and may refer to both the audio sample crystal rate and the sample output rate. Generally the sample output rate is a multiple of the audio sample crystal rate.

The phase adjustment refers to the adjustment of a clock value and the clock value may be for a clock incrementing at the audio crystal rate or the sample output clock output rate or some other counter value related to the sample output clock.

A key issue in this common event system is that the acknowledge messages 354, 354' and adjustment messages 356, 356' may not arrive at a predictable time at the receiving end, as they are being sent over an IP network. Each acknowledge message includes the destination device number.

Therefore the synchronization module 352, cannot group acknowledge messages 354, 354' for the same event by time of arrival. For example, some acknowledge messages for Event 1 may arrive at the synchronization Module 352, after acknowledge messages for Event 2 arrive. Therefore acknowledge messages are grouped into sets of event acknowledge messages based on the unique event number.

To do this, the synchronization module 352 can associate all acknowledge messages sent from the set of destination devices for each Unique EVENT. Therefore the, synchronization module marks each event message with a number, n, which is unique over time for the lifetime of the system. This may simply be an event number that increments with each event. All the destination devices, include this unique event number in the acknowledge messages AK 354, 354'. When ever an acknowledge messages AK 354, 354' is received at the synchronization Module 352, the acknowledge messages are placed in a collection of acknowledge messages {AK(Dab), . . . AK(D1n) . . . AK(Dxn), AK(D1n+1 . . . etc}. Then this collection is searched to find a subset of all the acknowledge messages for a particular event number n, {AK(D1n) . . . AK(Dxn)}. Then the phase change Qxn with respect to device 1, is calculated using the values from this subset as shown in the calculations above. The values in this subset may be further filtered prior to use.

Figure 7:
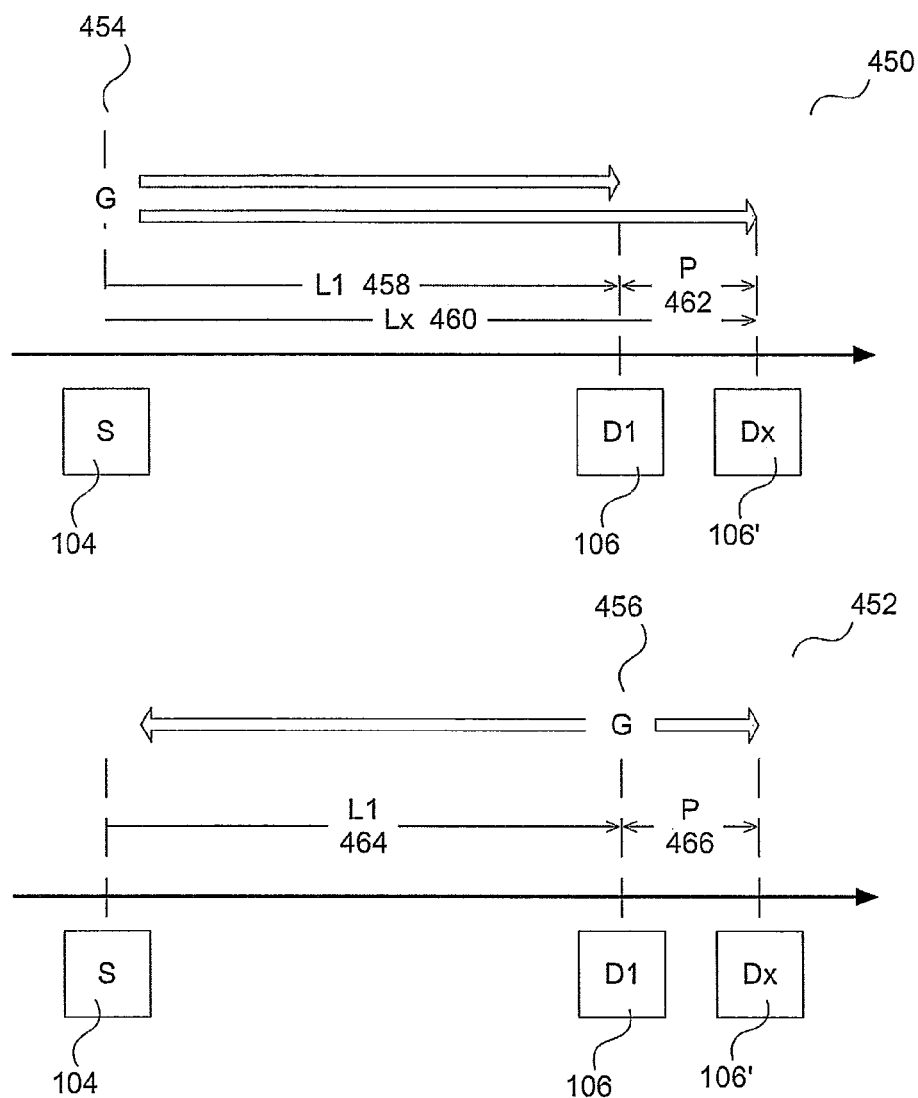
FIG. 7 is an illustration detailing differences between the common clock method and the common event method according to an embodiment of the invention.

In an alternate embodiment the event messages may come from an outside source such as by using the beacon messages of the Wi-Fi system. In this case the time value in the beacon messages may be used as a unique event number. Note the time value is not used as a time value, but only as a unique event number FIG. 7 identifies some important and critical differences between the common clock and common event methods described herein. The upper plot 450 shows the net effect of the common clock method. In this method source's 104 clock, a common clock, is a "global" clock 454 used by the system. This clock is used by each destination D1 106 through Dx 106', which estimates a common source clock time to adjust its local clock by. As mentioned above, the accuracy of this setting is affected by transport latency L1 458 and Lx 460. Each destination device D1 106 and Dx 106' independently estimates a common clock time, so phase difference P 462 of these clocks will be highly dependent on these latencies. Since transport latencies vary from message to message, which is referred to as transport jitter, this means destination devices clocks' (D1 136 and Dx 136') clock settings have accuracies that are subject to transport jitter. Specifically this means the difference in the clocks, the phase difference, is subject to the maximum message transport jitter Jx. Keeping phase accuracy in rendering media on both devices D1 106 and Dx 106' is desirable. The suggests it would be best to avoid having transport jitter affect phase accuracy.

Overall, the common clock method aligns all clocks with the common clock at the source, the adjustment calculations are done independently at each destination, and the accuracy is dependent on recording accuracy Rx and transport jitter Jx.

The lower plot 452 shows the common event approach used in various embodiments of the invention. In this approach clock D1 of first destination device 106 becomes a reference, "global" clock 456, used in the system. Additional destination devices 106' adjust their clocks Dx to the global clock of D1 106. Phase differences P 466 of these clocks are unaffected by transport latencies and only related by how accurately they record a common event at the point of receipt. Transport latency L1 464 is only a factor in projecting global clock 456 back to source 104. In an embodiment of the invention source 104 adjusts its clock to match destination clock D1 106 if needed. In this embodiment there is no need for a source clock or such an adjustment.

Overall, the common event approach aligns all clocks with one of the destination clocks, and the accuracy is dependent on recording accuracy Rx only. Since transport jitter Jx tends to be many times larger than recording accuracy Rx, as transport jitter is affected by all the devices and processes involved in the transport of the message (whereas the recording accuracy is only dependent on and local to the destination hardware and its software). Transport jitter can be many milliseconds, whereas recording jitter is usually less than a few hundred microseconds. So the common event approach, being dependent only on recording accuracy, is a better approach to providing high levels of phase synchronization accuracy with less effort and complexity.

Figure 8:
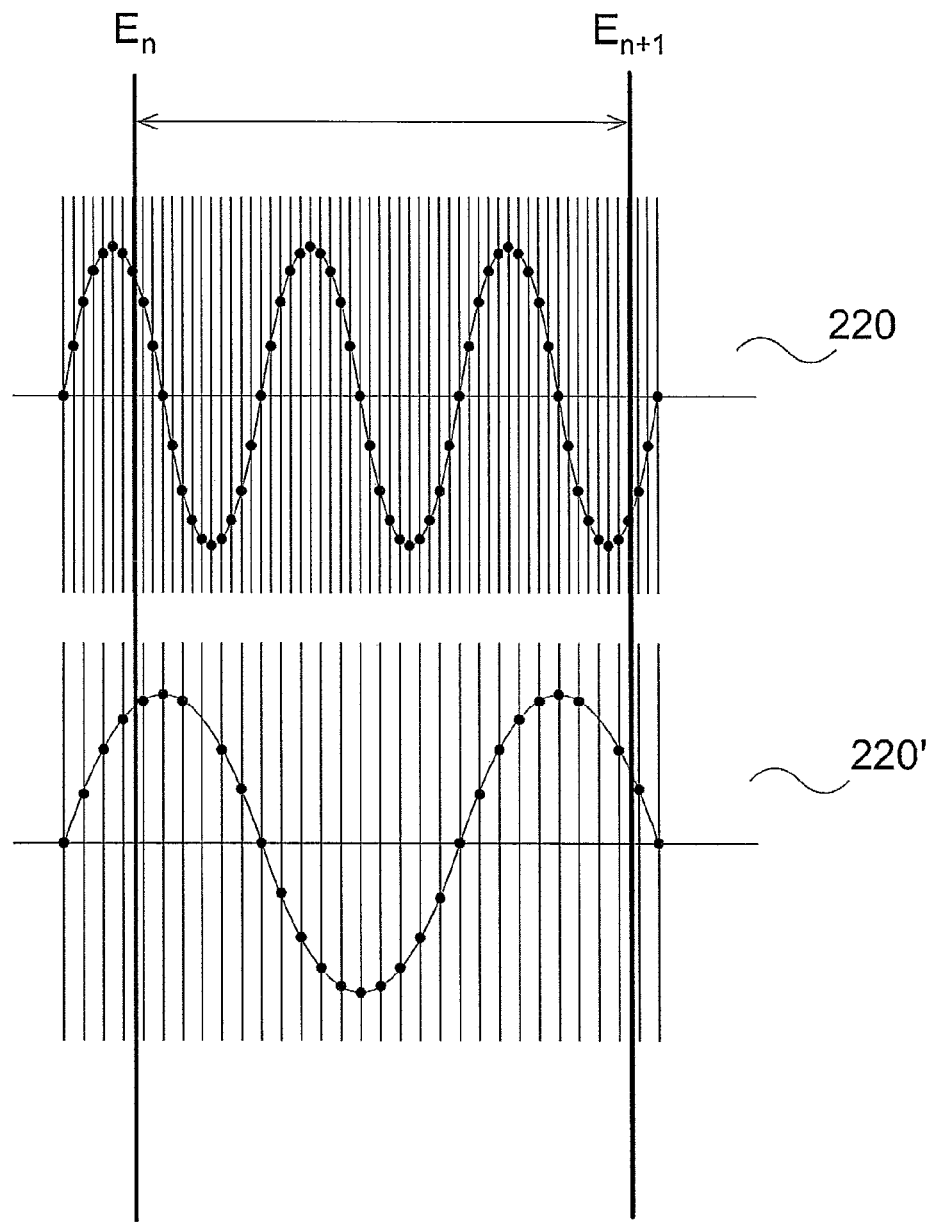
FIG. 8 is an illustration of the overall effect of using a common event-based system according to an embodiment of the invention.

FIG. 8 shows an exaggerated view of the overall effect of the common event approach. The upper waveform 220 is the output of the DAC from device D1 106 and the lower waveform 220' is the output from the DAC from device Dx 106'. The vertical lines on both plots show the clock ticks of their respective rendering clocks (DAC sample rate output clock). Also plotted on the vertical lines are the sample data that would be rendered on each clock tick. In FIG. 8, the lower waveform Dx has a much slower clock tick than the upper waveform and therefore the audio samples are rendered over a longer time period than in device D1. This Figure also shows two common events $E_n$ and $E_{n+1}$. As can be seen the amount of clock ticks that the lower waveform from D1 has incremented is less than the amount of clock ticks that have been incremented in the upper waveform 220. The phase at time $E_n$ is the difference in clock count between the two devices at time $E_n$. The phase at time $E_{n+1}$ is also this difference. Since the clock rates are different, it can be seen that the phase at event $E_n$, is going to be different from that at event $E_{n+1}$. The common event calculations and adjustment mentioned above will correct for this and increase the clock rate of the lower waveform 220' until its clock rate matches that of the upper waveform 220. At that point the two waveforms would be rendered similarly and will be rendered in phase.

The adjustment of the local clock rate can be done in a number of ways. The common approach is to literally adjust the clock rate of the rendering clock. Usually this requires some sort of hardware subsystem that can generate a clock that is adjustable. An alternative approach is to leave the rendering clock alone and to adjust the media data instead. This approach is to convert the sample rate, do a sample rate conversion, to compensate for the clock rate difference. If a 1 KHz audio signal were sampled at 44.1 KHz and was then rendered by a 44.1 KHz clock the audio signal rendered will be an accurate representation of the original. If the rendering clock is 44 KHz instead, then the 1 KHz audio signal will be rendered at a slightly lower tone and will not be an accurate representation of the original. If the audio data were now sample rate converted from 44.1 KHz to 44 KHz and rendered using the 44 KHz rendering clock, the 1 KHz audio signal rendered will now again be an accurate representation of the original.

A preferred embodiment of the invention uses the latter sample rate conversion approach. When frequency adjustment messages are received by each destination, instead of adjusting the rendering clock, each destination performs a sample rate conversion on the data stream, increasing or decreasing the sample rate of the data. This has the same net effect as adjusting the rendering clock.

Typically the difference in frequency is related to the accuracy of clock crystals which are specified in PPM, parts per million. A 100 PPM crystal is accurate to <0.01% or 1 part in 10,000. So the sample rate conversion required here is a small adjustment typically 1 sample in 10,000 samples. So the adjustment can be accomplished by adding or dropping a sample every so often.

Figure 9:
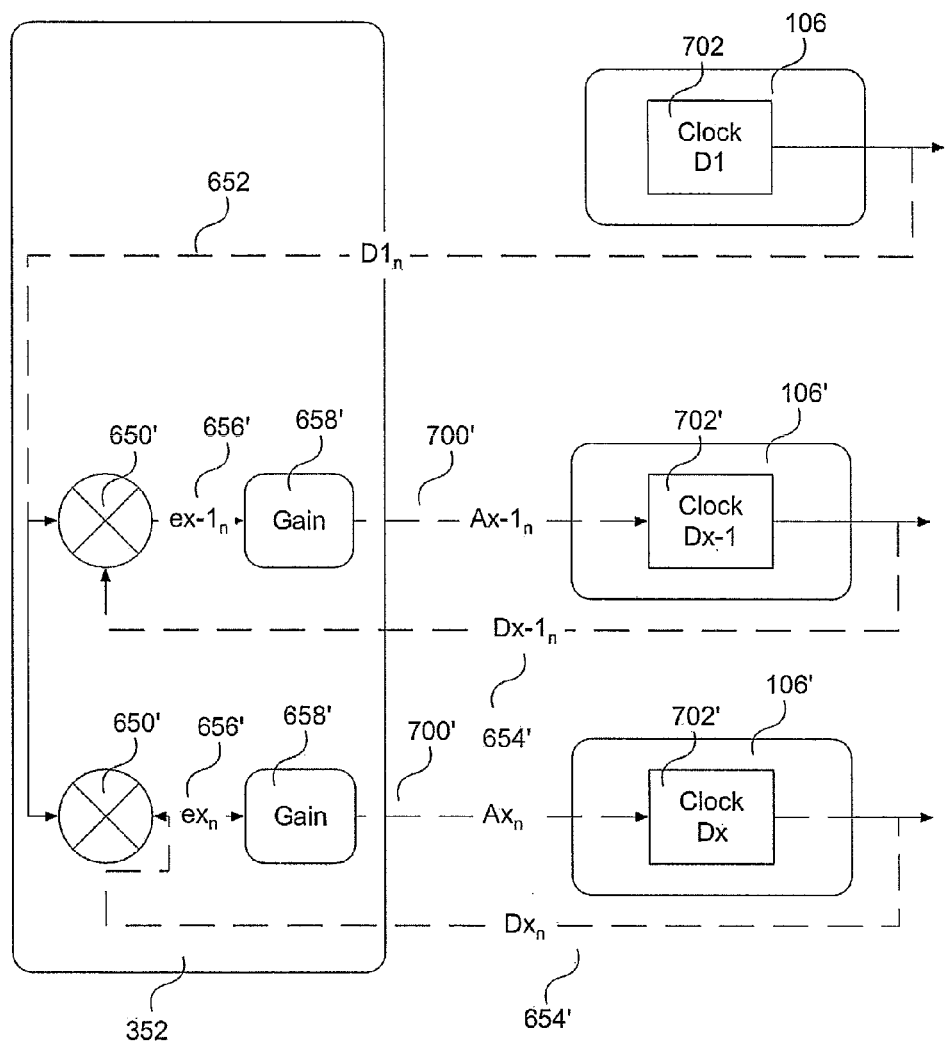
FIG. 9 is an illustration of the overall effect of using a common event-based algorithm according to an embodiment of the invention.

FIG. 9 illustrates the algorithm described previously in the form of a control system. This shows several devices marked as D1 106 through Dx 106'. Each destination device, excluding a first device D1 106, implements a software phase lock loop algorithm to lock its phase to the clock phase of device D1 106. Associated with each destination device Dx 106' is a phase comparator 650' that compares the phase of its output clock $Dx_n$ 654' to the reference clock D1 652. The phase difference with respect to the reference clock $e_{x-1}$ 656 is then scaled to produce a clock frequency adjustment Ax 700'. This adjustment then causes the clock generator 702' at the destination 106' to adjust its clock frequency. In this embodiment of the system the phase detector 650' and gain/scale 658' reside on the synchronization calculation manager 352. The clock generator 702' resides on the destination device 106'.

Additional Consideration

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more intermediaries, logical or physical.

A description of an embodiment with several components in communication with each other does not imply that all such components are required. To the contrary, a variety of optional components may be described to illustrate a wide variety of possible embodiments of one or more of the inventions and in order to more fully illustrate one or more aspects of the inventions. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the invention(s), and does not imply that the illustrated process is preferred. Also, steps are generally described once per embodiment, but this does not mean they must occur once, or that they may only occur once each time a process, method, or algorithm is carried out or executed. Some steps may be omitted in some embodiments or some occurrences, or some steps may be executed more than once in a given embodiment or occurrence.

When a single device or article is described, it will be readily apparent that more than one device or article may be used in place of a single device or article. Similarly, where more than one device or article is described, it will be readily apparent that a single device or article may be used in place of the more than one device or article.

The functionality or the features of a device may be alternatively embodied by one or more other devices that are not explicitly described as having such functionality or features. Thus, other embodiments of one or more of the inventions need not include the device itself.

Techniques and mechanisms described or referenced herein will sometimes be described in singular form for clarity. However, it should be noted that particular embodiments include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of embodiments of the present invention in which, for example, functions may be executed out of order from that shown or discussed, including substantially concurrently or in reverse order, depending on the functionality involved, as would be understood by those having ordinary skill in the art.

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be disclosed herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, and the like), a consumer electronic device, a music player, or any other suitable electronic device, router, switch, or the like, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or the like). Moreover, in some embodiments one or more aspects, or all aspects, of the invention may optionally be implemented via a specially programmed chip (for instance, an application specific integrated circuit, or ASIC, or an erasable programmable read only memory, or EPROM), or via some other hardware-only approach known in the art.

Description of the Exemplary Hardware Embodiments

Figure 10:
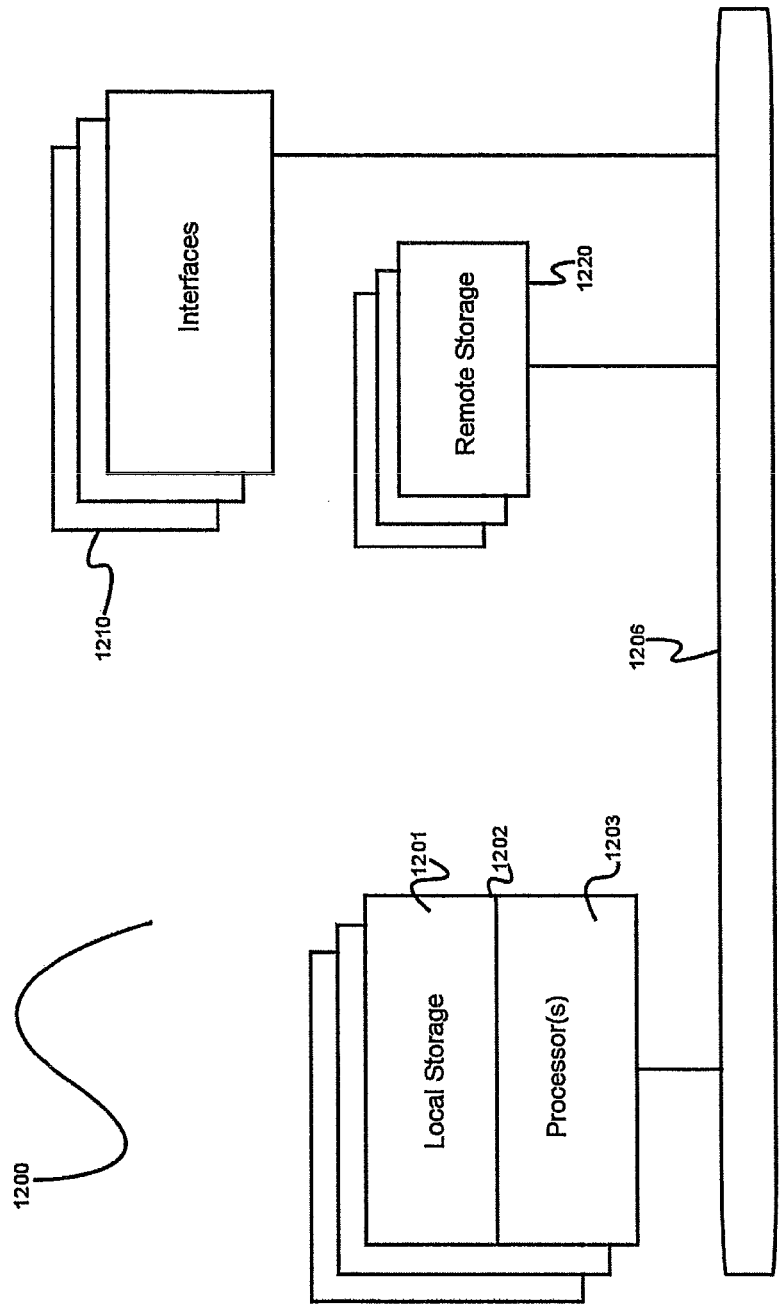
FIG. 10 is a block diagram illustrating an exemplary hardware architecture of a computing device used in an embodiment of an embodiment of the invention.

Referring now to FIG. 10, there is shown a block diagram depicting an exemplary computing device 1200 suitable for implementing at least a portion of the features or functionalities disclosed herein. Computing device 1200 may be, for example, any one of the computing machines listed in the previous paragraph, or indeed any other electronic device capable of executing software- or hardware-based instructions according to one or more programs stored in memory. Computing device 1200 may be adapted to communicate with a plurality of other computing devices, such as clients or servers, over communications networks such as a wide area network a metropolitan area network, a local area network, a wireless network, the Internet, or any other network, using known protocols for such communication, whether wireless or wired.

In one embodiment, computing device 1200 includes one or more central processing units (CPU) 1202, one or more interfaces 1210, and one or more busses 1206 (such as a peripheral component interconnect (PCI) bus). When acting under the control of appropriate software or firmware, CPU 1202 may be responsible for implementing specific functions associated with the functions of a specifically configured computing device or machine. For example, in at least one embodiment, a computing device 1200 may be configured or designed to function as a server system utilizing CPU 1202, local memory 1201 and/or remote memory 1220, and interface's) 1210. In at least one embodiment, CPU 1202 may be caused to perform one or more of the different types of functions and/or operations under the control of software modules or components, which for example, may include an operating system and any appropriate applications software, drivers, and the like.

CPU 1202 may include one or more processors 1203 such as, for example, a processor from one of the Intel, ARM, Qualcomm, and AMD families of microprocessors. In some embodiments, processors 1203 may include specially designed hardware such as application-specific integrated circuits (ASICs), electrically erasable programmable read-only memories (EEPROMs), field-programmable gate arrays (FPGAs), and so forth, for controlling operations of computing device 1200. In a specific embodiment, a local memory 1201 (such as non-volatile random access memory (RAM) and/or read-only memory (ROM), including for example one or more levels of cached memory) may also form part of CPU 1202. However, there are many different ways in which memory may be coupled to system 1200. Memory 1201 may be used for a variety of purposes such as, for example, caching and/or storing data, programming instructions, and the like.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one embodiment, interfaces 1210 are provided as network interface cards (NICs). Generally, NICs control the sending and receiving of data packets over a computer network; other types of interfaces 1210 may for example support other peripherals used with computing device 1200. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, Firewire™, PCI, parallel, radio frequency (RF), Bluetooth™ near-field communications (e.g., using near-field magnetics), 802.11 (WiFi), frame relay, TCP/IP, ISDN, fast Ethernet interfaces, Gigabit Ethernet interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 1210 may include ports appropriate for communication with appropriate media. In some cases, they may also include an independent processor and, in some in stances, volatile and/or non-volatile memory (e.g., RAM).

Although the system shown in FIG. 10 illustrates one specific architecture for a computing device 1200 for implementing one or more of the inventions described herein, it is by no means the only device architecture on which at least a portion of the features and techniques described herein may be implemented. For example, architectures having one or any number of processors 1203 may be used, and such processors 1203 may be present in a single device or distributed among any number of devices. In one embodiment, a single processor 1203 handles communications as well as routing computations, while in other embodiments a separate dedicated communications processor may be provided. In various embodiments, different types of features or functionalities may be implemented in a system according to the invention that includes a client device (such as a tablet device or smartphone running client software) and server systems (such as a server system described in more detail below).

Regardless of network device configuration, the system of the present invention may employ one or more memories or memory modules (such as, for example, remote memory block 1220 and local memory 1201) configured to store data, program instructions for the general-purpose network operations, or other information relating to the functionality of the embodiments described herein (or any combinations of the above). Program instructions may control execution of or comprise an operating system and/or one or more applications, for example. Memory 1220 or memories 1201, 1220 may also be configured to store data structures, configuration data, encryption data, historical system operations information, or any other specific or generic non-program information described herein.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory, solid state drives, memristor memory, random access memory (RAM), and the like. Examples of program instructions include both object code, such as may be produced by a compiler, machine code, such as may be produced by an assembler or a linker, byte code, such as may be generated by for example a Java™ compiler and may be executed using a Java virtual machine or equivalent, or files containing higher level code that may be executed by the computer using an interpreter (for example, scripts written in Python, Perl, Ruby, Groovy, or any other scripting language).

Figure 11:
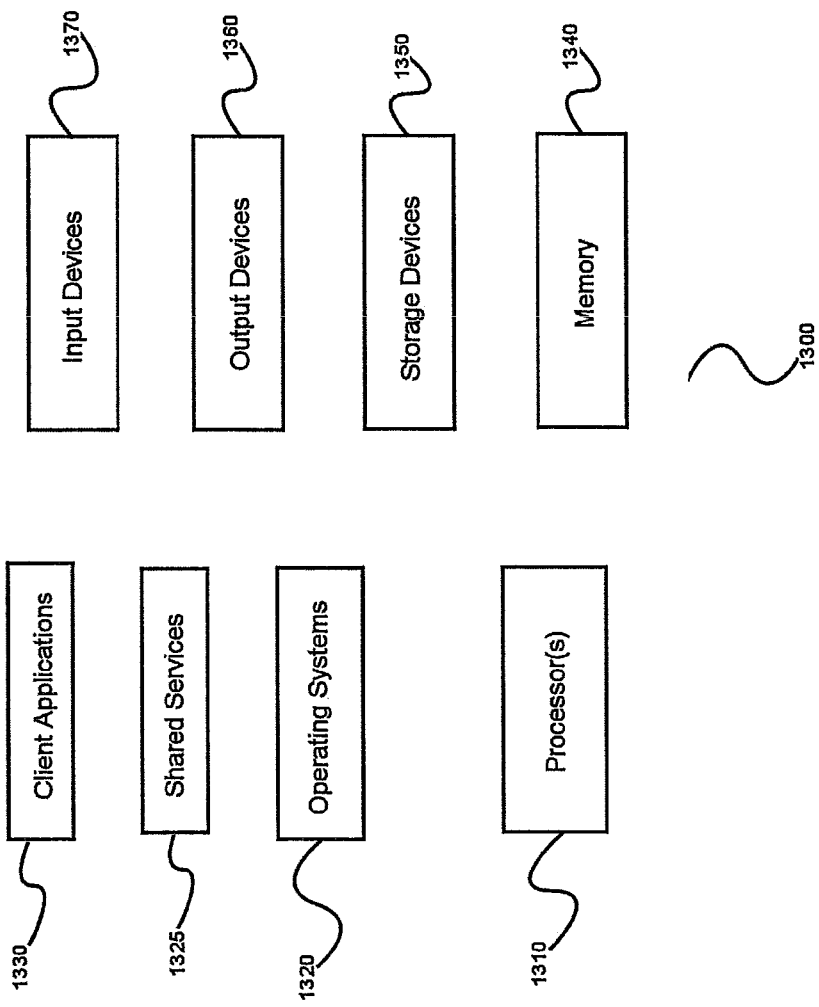
FIG. 11 is a block diagram illustrating an exemplary logical architecture for a client device, according to an embodiment of an embodiment of the invention.

In some embodiments, systems according to the present invention may be implemented on a standalone computing system. Referring now to FIG. 11, there is shown a block diagram depicting a typical exemplary architecture of one or more embodiments or components thereof on a standalone computing system. Computing device 1300 includes processors 1310 that may run software that carry out one or more functions or applications of embodiments of the invention, such as for example a client application 1330. Processors 1310 may carry out computing instructions under control of an operating system 1320 such as, for example, a version of Microsoft's Windows™ operating system, Apple's Mac OS/X or iOS operating systems, some variety of the Linux operating system, Google's Android™ operating system, or the like. In many cases, one or more shared services 1325 may be operable in system 1300, and may be useful for providing common services to client applications 1330. Services 1325 may for example be Windows™ services, user-space common services in a Linux environment, or any other type of common service architecture used with operating system 1310. Input devices 1370 may be of any type suitable for receiving user input, including for example a keyboard, touchscreen, microphone (for example, for voice input), mouse, touchpad, trackball, or any combination thereof. Output devices 1360 may be of any type suitable for providing output to one or more users, whether remote or local to system 1300, and may include for example one or more screens for visual output, speakers, printers, or any combination thereof. Memory 1340 may be random-access memory having any structure and architecture known in the art, for use by processors 1310, for example to run software. Storage devices 1350 may be any magnetic, optical, mechanical, memristor, or electrical storage device for storage of data in digital form. Examples of storage devices 1350 include flash memory, magnetic hard drive, CD-ROM, and/or the like.

Figure 12:
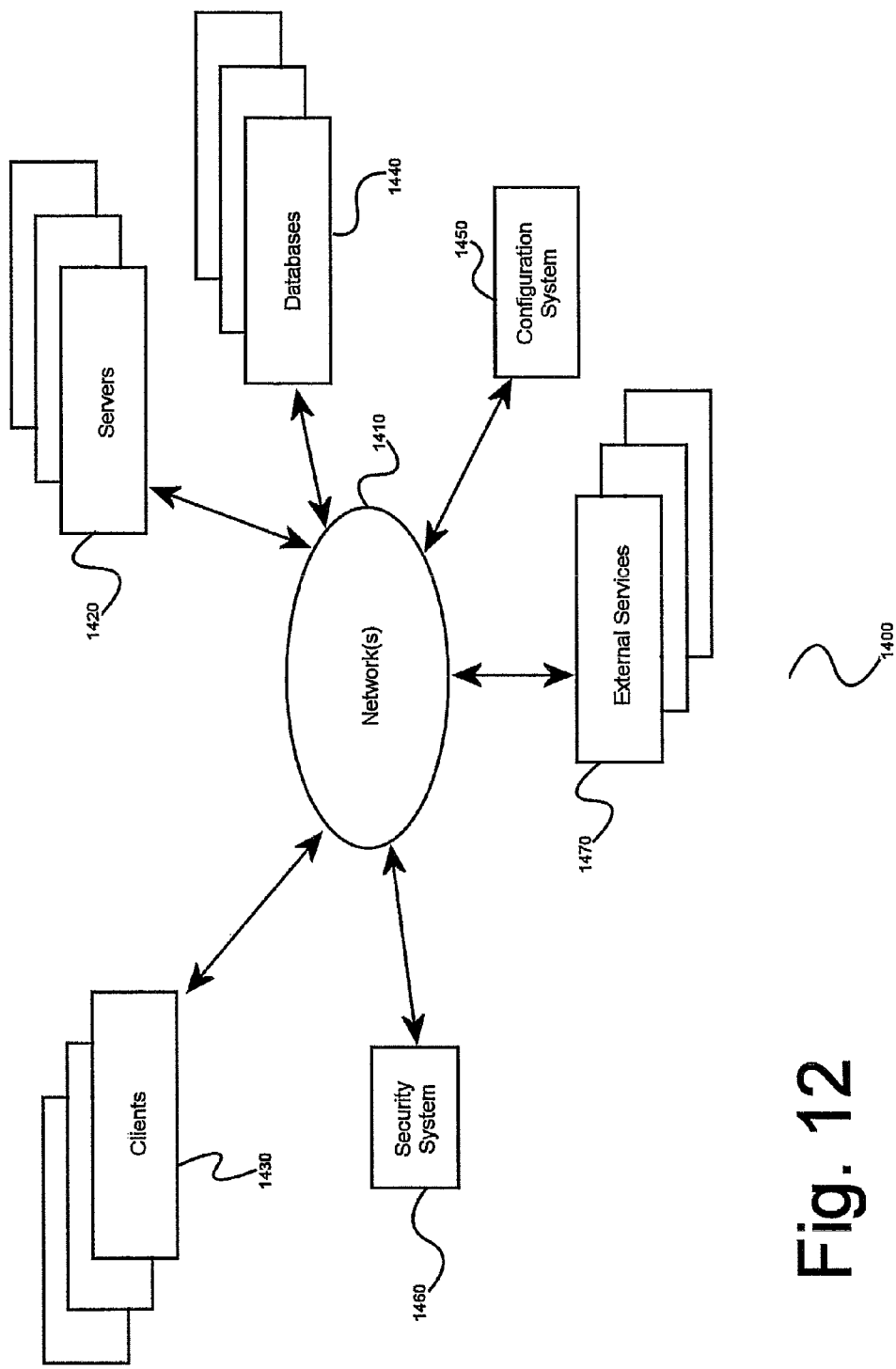
FIG. 12 is a block diagram showing an exemplary architectural arrangement of clients, servers, and external services, according to an embodiment of an embodiment of the invention.

In some embodiments, systems of the present invention may be implemented on a distributed computing network, such as one having any number of clients and/or servers. Referring now to FIG. 12, there is shown a block diagram depicting an exemplary architecture for implementing at least a portion of a system according to an embodiment of the invention on a distributed computing network. According to the embodiment, any number of clients 1430 may be provided. Each client 1430 may run software for implementing client-side portions of the present invention; clients may comprise a system 1300 such as that illustrated in FIG. 11. In addition, any number of servers 1420 may be provided for handling requests received from one or more clients 1430. Clients 1430 and servers 1420 may communicate with one another via one or more electronic networks 1410, which may be in various embodiments any of the Internet, a wide area network, a mobile telephony network, a wireless network (such as WiFi, Wimax, and so forth), or a local area network (or indeed any network topology known in the art; the invention does not prefer any one network topology over any other). Networks 1410 may be implemented using any known network protocols, including for example wired and/or wireless protocols.

In addition, in some embodiments, servers 1420 may call external services 1470 when needed to obtain additional information, or to refer to additional data concerning a particular call. Communications with external services 1470 may take place, for example, via one or more networks 1410. In various embodiments, external services 1470 may comprise web-enabled services or functionality related to or installed on the hardware device itself. For example, in an embodiment where client applications 1330 are implemented on a smartphone or other electronic device, client applications 1330 may obtain information stored in a server system 1420 in the cloud or on an external service 1470 deployed on one or more of a particular enterprise's or user's premises.

In some embodiments of the invention, clients 1430 or servers 1420 (or both) may make use of one or more specialized services or appliances that may be deployed locally or remotely across one or more networks 1410. For example, one or more databases 1440 may be used or referred to by one or more embodiments of the invention. It should be understood by one having ordinary skill in the art that databases 1440 may be arranged in a wide variety of architectures and using a wide variety of data access and manipulation means. For example, in various embodiments one or more databases 1440 may comprise a relational database system using a structured query language (SQL), while others may comprise an alternative data storage technology such as those referred to in the art as "NoSQL" (for example, Hadoop Cassandra, Google BigTable, and so forth). In some embodiments, variant database architectures such as column-oriented databases, in-memory databases, clustered databases, distributed databases, or even flat file data repositories may be used according to the invention. It will be appreciated by one having ordinary skill in the art that any combination of known or future database technologies may be used as appropriate, unless a specific database technology or a specific arrangement of components is specified for a particular embodiment herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, most embodiments of the invention may make use of one or more security systems 1460 and configuration systems 1450. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments of the invention without limitation, unless a specific security 1460 or configuration system 1450 or approach is specifically required by the description of any specific embodiment.

In various embodiments, functionality for implementing systems or methods of the present invention may be distributed among any number of client and/or server components. For example, various software modules may be implemented for performing various functions in connection with the present invention, and such modules can be variously implemented to run on server and/or client components.

The various embodiments disclosed herein accordingly enable the sending of media from a source to multiple media devices, such as TV and speakers in the same listening and viewing space. According toe the embodiments, this may be done over a wireless network such as Wi-Fi. The various embodiments enable all of the media rendering devices, such as speakers, that are in the same listening or viewing zone, to be precisely synchronized to each other, so the listener and/or viewer does not discern any unintended media experience.

The skilled person will be aware of a range of possible modifications of the various embodiments described above. Accordingly, the present invention is defined by the claims and their equivalents.

What is claimed is:

1. A system for event-based synchronized multimedia playback, comprising:

a plurality of destination devices, each comprising a local clock and connected to a network and configured to render media received over the network; and a synchronization module operating on a device connected to the network and configured to communicate with the plurality of destination devices, the synchronization module periodically transmitting a common event $E_n$, with a unique event identifier n, to each of the plurality of destination devices;

wherein each destination device records a time $D_{xn}$ when event $E_n$ is received and transmits an acknowledgement message comprising at least the time $D_{xn}$ and the unique event identifier n;

wherein the synchronization module, for each of the plurality of destination devices, carries out the steps of:

(a) determining a frequency difference between the local clock of the respective destination device and the local clock of a first destination device;
(b) computing a frequency adjustment to compensate for the difference determined in (a) between the first destination device and the respective device; and
(c) directing the respective destination device to do one or both of:
adjust its clock frequency by an amount related to the value determined in (b); or
perform a sample rate conversion on media received from the media source device to carry out a frequency adjustment related to the value determined in (b); and
each destination device thereby synchronously renders media received over the network from a media source configured to stream audio or video media.

2. The system of claim 1, further wherein the synchronization module, for each of the plurality of destination devices, carries out the steps of:
(a) determining a clock offset between the local clock of the respective destination device and the local clock of a first destination device; and
(b) directing the respective destination device to adjust its clock count or phase by the clock offset.

3. A method for common event-based synchronized multimedia playback, the method comprising the steps of:
(a) periodically transmitting, from a synchronization module operating on a device connected to a network, a common event En comprising a unique event identifier n;
(b) receiving via the network, at each of a plurality of destination devices comprising a local clock, the event En;
(c) recording at each destination device a time Dxn when event En is received;
(d) transmitting an acknowledgement message from each destination device back to the synchronization module, the acknowledgment message comprising at least the time Dxn and the unique event identifier n;
(e) the synchronization module determining a frequency difference between the clocks of the respective destination devices;
(f) computing a frequency adjustment to compensate for the differences determined in step (e);
(g) directing the respective destination device to do one or both of:
adjust its clock frequency by an amount related to the values determined in step (f); or
perform a sample rate conversion on media received from the media source device to carry out a frequency adjustment related to the value determined in step (f); and
(h) the destination devices using this adjustment information to synchronously render media received over the network from a source for streaming audio or video media.

4. The method of claim 3, further wherein the synchronization module, for each of the plurality of destination devices, carries out the steps of:
(a) determining a clock offset between the local clock of the respective destination device and the local clock of a first destination device; and
(b) directing the respective destination device to adjust its clock count or phase by the clock offset.

5. A system for event-based synchronized multimedia playback, comprising:
a plurality of destination devices, each comprising a local clock and connected via the network and configured to render media received over the network; and
a synchronization module operating on a device connected to the network and configured to communicate with the plurality of destination devices;
wherein the synchronization module collects a plurality of acknowledgement messages for each event En into a collection and retrieves the collection of acknowledgement messages it has received that have an event identifier n, creates a subset of acknowledgement messages for event En, and uses the subset of messages for event En to compute a frequency adjustment for a first destination device, and directs the first destination device to:
adjust its clock frequency by an amount related to the computed frequency adjustment; or
perform a sample rate conversion on media received from the media source device to carry out a frequency adjustment related to the computed frequency adjustment.

6. The system of claim 5, where the event messages received by the destination devices originate from the synchronization module.

7. The system of claim 5, further wherein the synchronization module, for each of the plurality of destination devices, carries out the steps of:
(a) determining a clock offset between the local clock of the respective destination device and the local clock of a first destination device; and
(b) directing the respective destination device to adjust its clock count or phase by the clock offset.

8. A system for event-based synchronized multimedia playback, comprising:
a plurality of destination devices, each comprising a local clock and connected to a network and configured to render media received over the network; and
a synchronization module operating on one of the destination devices;
the synchronization module periodically transmitting a common event En, with a unique event identifier n, to each of the plurality of destination devices;
wherein each destination device records a time Dxn when event En is received and transmits an acknowledgement message back to the synchronization module comprising at least the time Dxn and the unique event identifier n; and
wherein the synchronization module, for each of the plurality of destination devices, carries out the steps of:
(a) determining a frequency difference between the local clock of the respective destination device and the local clock of a first destination device;
(b) computing a frequency adjustment to compensate for the differences determined in (a) between the first destination device and the respective device; and
(c) directing the respective destination device to do one or both of:
adjusting its clock frequency by an amount related to the values determined in (b); or
performing a sample rate conversion on media received from the media source device to carry out a frequency adjustment related to the value determined in (b).

9. A system for event-based synchronized multimedia playback, comprising:
a synchronization module operating on a device comprising at least a memory and a processor and connected to the network;

the synchronization module periodically transmitting via the network a common event En, with a unique event identifier n, to each of a plurality of destination devices;

wherein the synchronization module receives a plurality of acknowledgment messages via the network, each acknowledgment message comprising at least a time Dxn when a corresponding event En was received at a specific destination device and the unique event identifier n; and wherein the synchronization module, for each of the plurality of destination devices, carries out the steps of:
  (a) determining a frequency difference between the local clock of the respective destination device and the local clock of a first destination device;
  (b) computing a frequency adjustment to compensate for the difference determined in (a) between the first destination device and the respective device; and
  (c) sending a directive message to the respective destination device instructing the respective destination device to do one or both of:
    adjusting its clock frequency by an amount related to the values determined in (b); or
    performing a sample rate conversion on media received from the media source device to carry out a frequency adjustment related to the value determined in (b).

10. A method for common event-based synchronized multimedia playback, the method comprising the steps of:
  (a) transmitting, from a synchronization device comprising at least a memory and a processor and connected to a network, a plurality of common events, each event En comprising a unique event identifier n;
  (b) receiving, at the device, a plurality of acknowledgement messages from a plurality of destination devices, each acknowledgment message comprising at least a time Dxn at which common event En was received at a respective destination device and the unique event identifier n;
  (c) determining, at the synchronization device, a frequency difference between the clocks of the respective destination devices based on the acknowledgment messages;
  (d) computing, at the synchronization device, a frequency adjustment to compensate for the differences determined in step (c); and
  (e) sending a directive message to the respective destination device to do one or both of:
    adjusting its clock frequency by an amount related to the values determined in step (d); or
    performing a sample rate conversion on media received from the media source device to carry out a frequency adjustment related to the value determined in step (d).

11. A method for common event-based synchronized multimedia playback, the method comprising the steps of:
  (a) simultaneously receiving via a network, at each of a plurality of destination devices each comprising a local clock, a common event En comprising a unique event identifier n;
  (b) recording at each destination device a time Dxn when event En is received;
  (c) transmitting an acknowledgement message from each destination device via the network, the acknowledgment message comprising at least the time Dxn and the unique event identifier n; and
  (d) receiving at each destination device a directive message to do one or both of:
    adjusting its clock frequency by an amount; or
    performing a sample rate conversion on media received from the media source device to carry out a frequency adjustment.

* * * * *